United States Patent
Chen et al.

(10) Patent No.: US 12,149,457 B2
(45) Date of Patent: Nov. 19, 2024

(54) DOWNLINK TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Jiejiao Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 401 days.

(21) Appl. No.: 17/673,723

(22) Filed: Feb. 16, 2022

(65) Prior Publication Data

US 2022/0173847 A1 Jun. 2, 2022

Related U.S. Application Data

(63) Continuation of application No. PCT/CN2020/075141, filed on Feb. 13, 2020.

(51) Int. Cl.
*H04L 5/00* (2006.01)
*H04L 1/08* (2006.01)

(52) U.S. Cl.
CPC .............. *H04L 5/0007* (2013.01); *H04L 1/08* (2013.01); *H04L 5/0048* (2013.01)

(58) Field of Classification Search
CPC ................................ H04L 1/08; H04L 5/0048
See application file for complete search history.

(56) References Cited

U.S. PATENT DOCUMENTS

| | | |
|---|---|---|
| 2019/0058517 A1 | 2/2019 | Kang et al. |
| 2019/0313428 A1 | 10/2019 | Zhou et al. |
| 2019/0313434 A1 | 10/2019 | Zhou et al. |
| 2021/0050963 A1* | 2/2021 | Zarifi .................. H04W 56/001 |
| 2021/0136762 A1* | 5/2021 | Park ...................... H04W 24/10 |
| 2021/0160028 A1* | 5/2021 | Park ...................... H04L 5/0048 |

FOREIGN PATENT DOCUMENTS

| | | |
|---|---|---|
| CN | 109076544 | 12/2018 |
| EP | 3609088 | 2/2020 |

OTHER PUBLICATIONS

Intel Corporation, "Spatial QCL considerations for multiplexing of physical channels and RS", 3GPP TSG RAN WG1 Meeting #92b R1-1804717, Apr. 16-20, 2018, pp. 1-9.

(Continued)

*Primary Examiner* — Zhiren Qin
(74) *Attorney, Agent, or Firm* — JCIP GLOBAL INC.

(57) ABSTRACT

This disclosure relates to a downlink transmission method and a terminal device. The downlink transmission method includes: the terminal device determines the multiplexing mode of the first SSB and the downlink signal according to the PCID carried by the first SSB; the terminal device receives the first SSB and/or the downlink signal according to the multiplexing mode. By determining the multiplexing mode of the first SSB and the downlink signal through the PCID carried by the first SSB, it is possible to support the multiplexing of the SSB from different cells and other downlink signals, thus better supporting multi-TRP transmission between cells.

8 Claims, 4 Drawing Sheets

200

The terminal device determines the multiplexing mode of the first SSB and the downlink signal according to the PCID carried by the first SSB — S210

The terminal device receives the first SSB and/or the downlink signal according to the multiplexing mode — S220

(56) References Cited

OTHER PUBLICATIONS

"Search Report of of counterpart Europe application No. 20919297.0", issued on Sep. 20, 2022, p. 1-p. 7.
Intel Corporation, "Remaining Details of RLM", 3GPP TSG RAN WG1 Meeting #92bis R1-1804709, Apr. 16-20, 2018, pp. 1-5.
3GPP, "Physical channels and modulation", 3GPP TS 38.211 V16.0.0, Dec. 2019, pp. 1-124.
3GPP, "Physical layer procedures for data", 3GPP TS 38.214 V16.0.0, Dec. 2019, pp. 1-147.
"International Search Report (Form PCT/ISA/210) of PCT/CN2020/075141", mailed on Nov. 2, 2020, with English translation thereof, pp. 1-7.
"Written Opinion of the International Searching Authority (Form PCT/ISA/237) of PCT/CN2020/075141", mailed on Nov. 2, 2020, with English translation thereof, pp. 1-7.
"Office Action of Europe Counterpart Application, Application No. 20919297.0", issued on Apr. 26, 2023, p. 1-p. 5.
Office Action of China Counterpart Application, Application No. 202111342006.3, with English translation thereof, issued on Apr. 12, 2023, pp. 1-13.

* cited by examiner

DOWNLINK TRANSMISSION METHOD AND TERMINAL DEVICE

CROSS-REFERENCE TO RELATED APPLICATIONS

This application is a continuation of international PCT application serial no. PCT/CN2020/075141, filed on Feb. 13, 2020. The entirety of each of the above-mentioned patent applications is hereby incorporated by reference herein and made a part of this specification.

BACKGROUND

Field of the Disclosure

This disclosure relates to the field of communication technology, and more specifically, to a downlink transmission method and a terminal device.

Description of Related Art

In the NR (New Radio) system, the network device can indicate the TCI (Transmission Configuration Indicator) status of the downlink signal through downlink signaling, including the QCL (Quasi-Co-location) reference signal used for receiving the downlink signal. The QCL reference signal may be SSB (Synchronization Signal Block) or CSI-RS (Channel State Information Reference Signal) of the serving cell. In the enhanced multi-TRP (Transmission/Reception Point) transmission scheme, the QCL reference signal not only can be the SSB of the serving cell, but also the SSB of the neighboring cell. Under the circumstances, there is a need to find out how to enable SSB which serves as QCL reference signal to multiplex with downlink signal.

SUMMARY OF THE DISCLOSURE

In view of this, the embodiments of this disclosure provide a downlink transmission method and a terminal device. The multiplexing mode of the SSB and the downlink signal is determined by the PCID carried by the reference signal SSB, which can support the multiplexing of the SSB from different cells and other downlink signals.

An embodiment of the disclosure provides a downlink transmission method, including the following steps:

The terminal device determines the multiplexing mode of the first synchronization signal block (SSB) and the downlink signal according to the physical cell identification (PCID) carried by the first SSB.

The terminal device receives the first SSB and/or the downlink signal according to the multiplexing mode.

An embodiment of the disclosure further provides a terminal device, including the following:

A processing unit is configured to determine the multiplexing mode of the first SSB and the downlink signal according to the physical cell identification (PCID) carried by the first synchronization signal block (SSB).

A communication unit is configured to receive the first SSB and/or the downlink signal according to the multiplexing mode.

An embodiment of the disclosure further provides a terminal device, which includes a processor and a memory. The memory is configured to store a computer program, and the processor is configured to invoke and run the computer program stored in the memory to execute the downlink transmission method described above.

An embodiment of the disclosure further provides a chip, which includes a processor, which is configured to invoke and run a computer program in the memory, so that the device provided with the chip executes the downlink transmission method described above.

An embodiment of the disclosure further provides a computer-readable storage medium for storing a computer program, which enables the computer to execute the downlink transmission method described above.

An embodiment of the disclosure further provides a computer program, which enables the computer to execute the downlink transmission method described above when the computer program is run on the computer.

An embodiment of the disclosure determines the multiplexing mode of the first SSB and the downlink signal through the PCID carried by the SSB, which can support the multiplexing of the SSB from different cells and other downlink signals, such as the multiplexing of the SSB of the neighboring cell and the downlink signal of the serving cell, thereby better supporting multi-TRP transmission between cells.

BRIEF DESCRIPTION OF THE DRAWINGS

FIG. 4 is a schematic flowchart of a downlink transmission method according to an embodiment of the disclosure.

FIG. 5 is a schematic diagram of a terminal device according to an embodiment of the disclosure.

DESCRIPTION OF EMBODIMENTS

Figure 1:
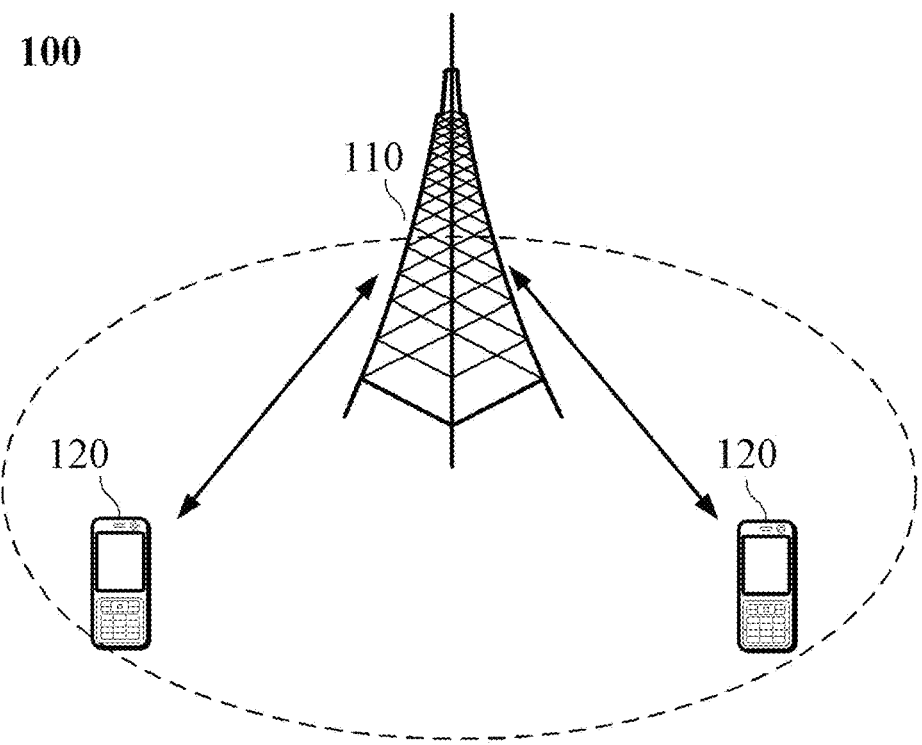
FIG. 1 is a schematic diagram of an application scenario of an embodiment of the disclosure.

The technical solutions in the embodiments of the disclosure will be described below in conjunction with the drawings in the embodiments of the disclosure.

The technical solutions of the embodiments of the disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U) system on unlicensed spectrum, NR-based access to unlicensed spectrum (NR-U) system, Universal Mobile Telecommunication System (UMTS), Wireless Local Area Networks (WLAN), Wireless Fidelity (WiFi), next-generation communications (5th-Generation, 5G) system or other communication systems, etc.

Generally speaking, conventional communication systems support a limited number of connections and the implementation is easy. However, with the development of communication technology, mobile communication systems will not only support conventional communication, but also support, for example, Device to Device (D2D) communication, machine to machine (M2M) communication, machine type communication (MTC), and vehicle to vehicle (V2V)

communication, etc. The embodiments of disclosure can also be applied to these communications systems.

Optionally, the communication system in the embodiment of the disclosure can be applied to a carrier aggregation (CA) scenario, can also be applied to a dual connectivity (DC) scenario, and can also be applied to a standalone (SA) deployment scenario.

The embodiments of the disclosure provide no limitation to the applied frequency spectrum. For example, the embodiments of the disclosure can be applied to licensed spectrum or unlicensed spectrum.

The embodiments of the disclosure describe various embodiments in combination with network device and terminal device. The terminal device can also be referred to as user equipment (UE), access terminal, user unit, user station, mobile station, mobile platform, remote station, remote terminal, mobile device, user terminal, terminal, wireless communication device, user agent or user apparatus, etc. The terminal device can be a station (STAION, ST) in a WLAN, a cellular phone, a cordless phone, a Session Initiation Protocol (SIP) phone, a wireless local loop (WLL) station, a Personal Digital Assistant (PDA) device, handheld devices with wireless communication capabilities, computing devices or other processing devices connected to wireless modems, in-vehicle devices, wearable devices, and next-generation communication systems, such as terminal device in NR networks or terminal device in the future evolution of the Public Land Mobile Network (PLMN) network, etc.

As an example and not a limitation, in the embodiment of the disclosure, the terminal device may also be a wearable device. Wearable devices can also be called wearable smart devices. Wearable smart device is a general term for the application of wearable technology for performing smart design on daily wear and developing wearable devices, such as glasses, gloves, watches, clothing and shoes. A wearable device is a portable device that is directly worn on the body or integrated into the user's clothes or accessories. Wearable devices are not only a kind of hardware device, but also realize powerful functions through software support, data interaction, and cloud interaction. Broadly speaking, wearable smart devices include those which are characterized in full-featured, large-sized, and capable of performing complete or partial functions without relying on smart phones, such as smart watches or smart glasses, etc., and those which only focus on a certain type of application function, and need to be operated in conjunction with other devices such as smart phones, such as smart bracelets and smart jewelry for monitoring physical signs.

The network device can be a device used to communicate with mobile devices. The network device can be an access point (AP) in WLAN, a Base Transceiver Station (BTS) in GSM or CDMA, or can be a NodeB (NB) in WCDMA, or can be an Evolutional Node B (eNB, or eNodeB) in LTE, or a relay station or access point, or a network device (gNB) in in-vehicle device, wearable devices, and NR networks, or a network device in future evolution of the PLMN network.

In the embodiment of the disclosure, the network device provides services for the cell, and the terminal device communicates with the network device through the transmission resources (for example, frequency-domain resources, or spectrum resources) used by the cell. The cell may be a cell corresponding to the network device (such as a base station). The cell can be a macro base station or a base station corresponding to a small cell. The small cell here can include: Metro cell, Micro cell, Pico cell, Femto cell, etc. These small cells are characterized in small coverage and low transmit power, and are suitable for providing high-speed data transmission services.

FIG. 1 exemplarily shows a network device 110 and two terminal devices 120. Optionally, the wireless communication system 100 may include multiple network devices 110, and the coverage of each network device 110 may include a larger or smaller number of terminal devices 120. The embodiment of the disclosure provides no limitation thereto.

Optionally, the wireless communication system 100 may further include other network entities such as Mobility Management Entity (MME), Access and Mobility Management Function (AMF), etc. The embodiment of the disclosure provides no limitation thereto.

It should be understood that the terms "system" and "network" in this disclosure are often used interchangeably in the disclosure. The term "and/or" in this disclosure only describes an association relationship between related objects, which means that there can be three types of relationships. For example, A and/or B can mean that A exists alone, A and B exist at the same time, and B exists alone. In addition, the symbol "/" in this disclosure generally indicates that the related objects before and after the symbol "/" are in an "or" relationship.

In the NR system, the network side can configure the corresponding TCI state for a downlink signal, indicating the QCL reference signal corresponding to the downlink signal, so that the terminal device receives the downlink signal based on the reference signal.

Specifically, a TCI state can include the following configurations:

TCI status ID, used to identify a TCI status;
QCL information 1;
QCL information 2.

Specifically, a QCL information can include the following information:

QCL type configuration, which can include one of QCL type A, QCL type B, QCL type C or QCL type D;
QCL reference signal configuration, which may include the cell ID where the reference signal is located, the BWP (Bandwidth Part, part of the bandwidth) ID, and the identification of the reference signal (for example, which may be CSI-RS resource ID or SSB index).

Specifically, in QCL information 1 and QCL information 2, the QCL type of at least one QCL information is one of type A, type B, and type C, and the QCL type of the other QCL information (if configured) is QCL type D.

The meanings of different QCL type configurations are as follows:

'QCL-Type A': {Doppler shift, Doppler spread, average delay, delay spread}
'QCL-Type B': {Doppler shift, Doppler spread}
'QCL-Type C': {Doppler shift, average delay}
'QCL-Type D': {Spatial Rx parameter}

If the network side configures the QCL reference signal of the target downlink channel as a reference SSB or reference CSI-RS resource through the TCI status, and the QCL type is configured as type A, type B, or type C, the terminal device can assume that the downlink signal is the same as the target large-scale parameters of the reference SSB or the reference CSI-RS resource, so the same corresponding receiving parameters are used for reception. The target large-scale parameters are determined by the QCL type configuration. Similarly, if the network side configures the QCL reference signal of the downlink signal as a reference SSB or reference CSI-RS resource through the TCI state, and the QCL type is configured as type D, then the terminal device can use the receiving beam (i.e., Spatial Rx parameter) that is the same as the receiving reference SSB or reference CSI-RS resource to receive the downlink signal. Generally, the downlink signal and its reference SSB or reference CSI-RS resource are transmitted by the same TRP or the same panel (antenna panel, panel for short) or the same beam on the network side. If the transmission TRP or transmission panel or transmission beam of the two downlink signals are different, usually different TCI states are configured.

In the NR system, the downlink and uplink non-coherent transmission based on multiple TRPs is introduced. Specifically, the backhaul network connection between TRPs can be ideal or non-ideal. Under ideal backhaul, TRPs can quickly and dynamically exchange information. Under non-ideal backhaul, TRPs can exchange information quasi-statically due to the large delay. In downlink non-coherent transmission, multiple TRPs can use different control channels to independently schedule multiple PDSCH transmissions of a terminal device, or the same control channel can be used to schedule the transmission of different TRPs. Different TRP data uses different transmission layers, the latter case is applicable in the condition of ideal backhaul.

Figure 2:
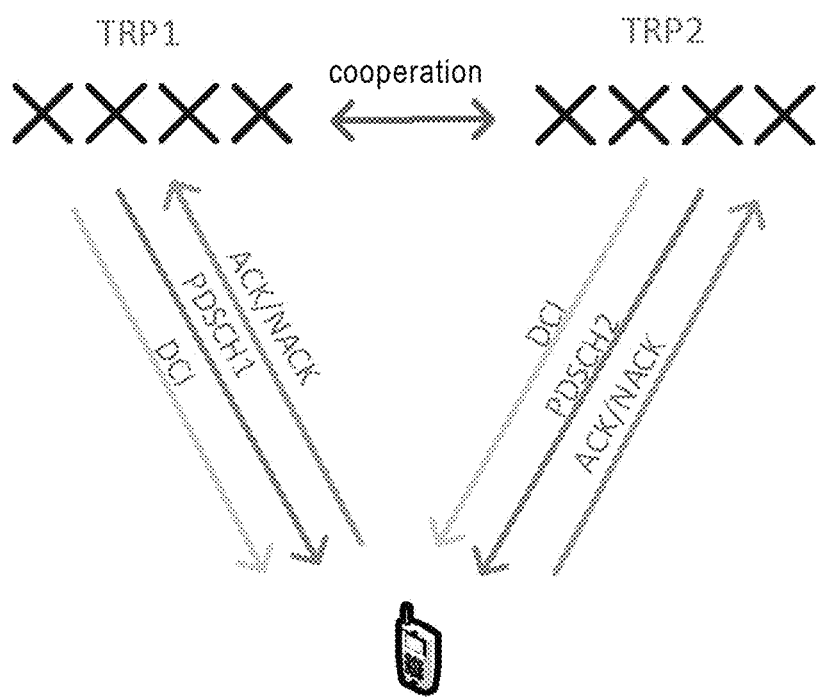
FIG. 2 and FIG. 3 are schematic diagrams of downlink non-coherent transmission based on multiple PDCCHs.
Figure 3:
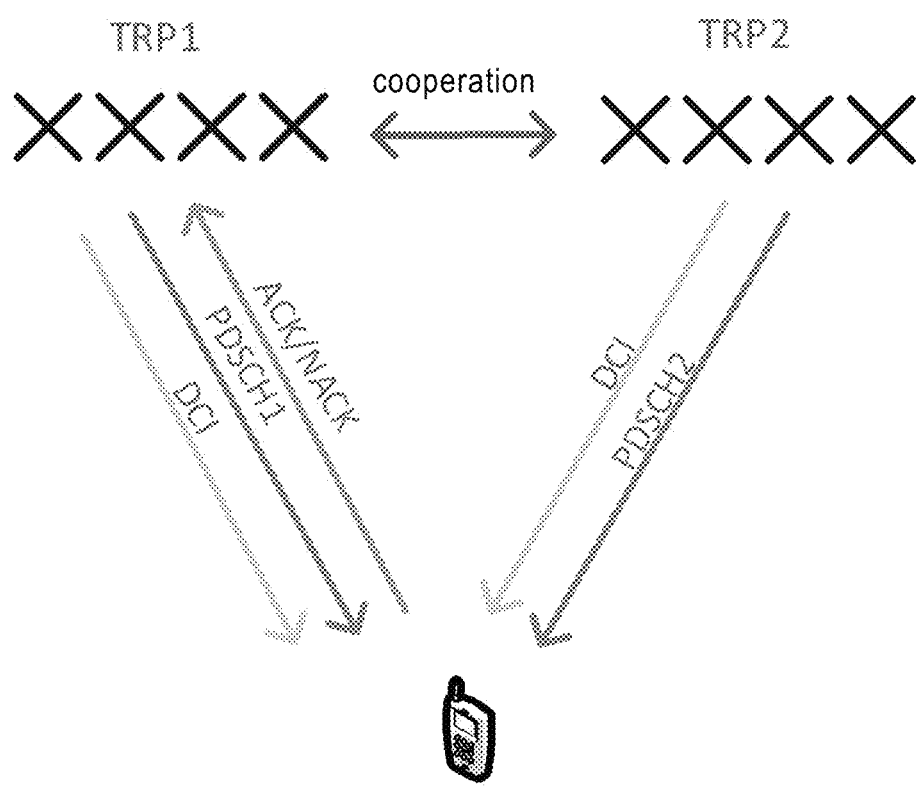

For downlink transmissions scheduled with multiple PDCCHs, the scheduled PDSCHs can be transmitted in the same time slot or in different time slots. The terminal device needs to support simultaneous reception of PDCCH and PDSCH from different TRPs. When the terminal device feeds back ACK/NACK (acknowledged/non-acknowledged) and CSI (Channel State Information), the terminal device can feed back ACK/NACK and CSI to different TRPs that transmit the corresponding PDSCH (as shown in FIG. 2) and can be combined and reported to a TRP (as shown in FIG. 3). The former can be applied in the condition of ideal backhaul and the condition of non-ideal backhaul, and the latter can be applied in the condition of ideal backhaul. Specifically, the DCI used to schedule PDSCH transmitted by different TRPs can be carried by different CORESETs (Control Resource Sets), that is, multiple CORESETs are configured on the network side. Each TRP uses its own CORESET for scheduling, that is, different TRPs can be distinguished by CORESET. For example, a network device can configure a CORESET group index for each CORESET, and different indexes correspond to different TRPs. When the terminal device returns CSI, the terminal device needs to separately return the corresponding CSI of each TRP. The CSI may include RI (Rank Indication). RANK is the rank in the antenna matrix in the MIMO scheme, representing N parallel and effective data flows, PMI (Pre-coding Matrix Indication), CQI (Channel Quality Indicator) and other content, and can be used for the scheduling of the respective TRP for downlink transmission.

The TCI indicating the downlink signal includes the QCL reference signal used to receive the downlink signal. The QCL reference signal may be an SSB of the serving cell. If the QCL reference signal SSB and the downlink signal PDSCH/CSI-RS of the serving cell are quasi co-located with respect to QCL type-D, these two signals can be FDM transmitted on the same OFDM symbol. In the process of multi-TRP transmission, the terminal device not only needs to receive downlink signals from the serving cell, but also needs to receive downlink signals from neighboring cells. The QCL reference signal of the downlink signal from the neighboring cell may be the SSB from the neighboring cell.

The embodiment of the disclosure provides a downlink transmission method. The terminal device determines the multiplexing mode of the SSB and other downlink signals according to the physical cell identification (PCID) carried by the SSB, thereby supporting the terminal device to receive the SSB sent by the neighboring cell as the QCL reference signal of other downlink signals. Based on the method in the embodiment of the disclosure, the terminal device can determine whether the SSB comes from the serving cell or the neighboring cell according to the PCID carried by the SSB. Further, the terminal device determines whether the SSB can be included in the same OFDM symbol for transmission with other downlink signals (downlink data includes, for example, PDSCH and downlink reference signals such as CSI-RS, etc.) and multiplexing mode within the same OFDM symbol. Then, the terminal device can receive the SSB from the neighboring cell as the QCL reference signal of other downlink signals based on the determined multiplexing mode, so as to better support the multi-TRP transmission between cells.

Figures 4, 5:
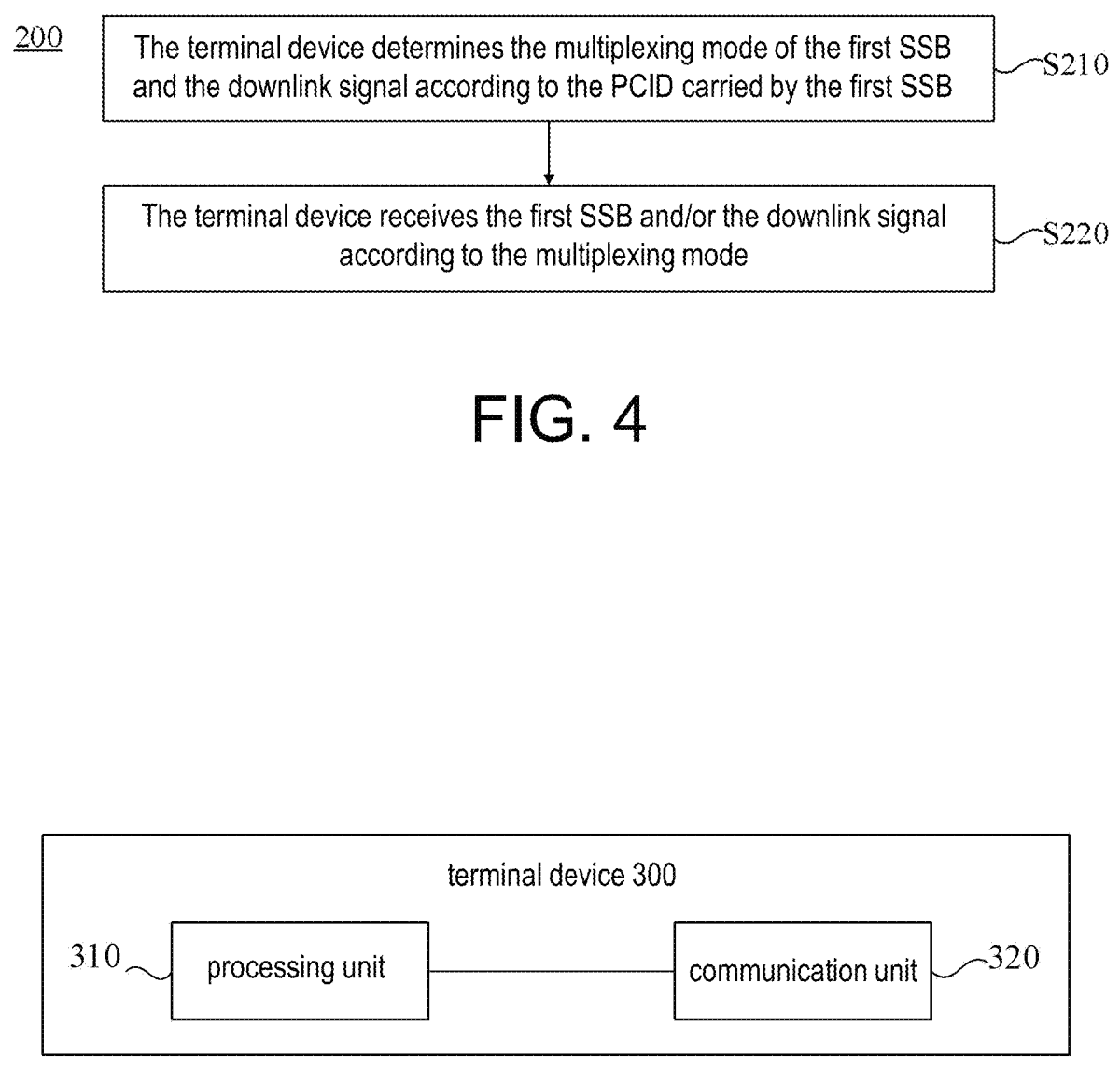

FIG. 4 is a schematic flowchart of a downlink transmission method 200 according to an embodiment of the disclosure. This method can be optionally applied to the system shown in FIG. 1, but is not limited thereto. The method includes at least part of the following content.

Step S210. The terminal device determines the multiplexing mode of the first SSB and the downlink signal according to the PCID (Physical Cell Identification) carried by the first SSB.

Step S220. The terminal device receives the first SSB and/or the downlink signal according to the multiplexing mode.

Optionally, in this embodiment of the disclosure, the first SSB may be used as the downlink reference signal or the QCL reference signal of the downlink channel. The downlink signal may be other downlink signals except the first SSB. For example, the downlink signal includes but is not limited to CSI-RS, PDSCH (Physical Downlink Shared Channel), SSB or PDCCH (Physical Downlink Control Channel), etc. In multi-TRP transmission, the terminal device can first determine whether the first SSB comes from the serving cell or the neighboring cell. There are many determining methods. For example, it can be determined whether the PCID carried by the first SSB is the same as the PCID carried by the SSB used to obtain the MIB (Master Information Block). If they are the same, it means that the first SSB comes from the serving cell. If they are different, it means that the first SSB comes from the neighboring cell. In another example, it can be determined whether the PCID carried by the first SSB is the same as the serving cell ID (Identification). If they are the same, it means that the first SSB comes from the serving cell. If they are different, it means that the first SSB comes from the neighboring cell. Still in another example, it can be determined whether the PCID carried by the first SSB is the same as the PCID carried by the second SSB. If they are the same, it means they are from the same cell. If they are different, it means they are from different cells.

Before receiving the first SSB and the downlink signal, the terminal device can obtain the PCID carried by the first SSB, and can also obtain the PCID carried by the SSB used to obtain the MIB, the serving cell ID, and the PCID carried by the second SSB. For example, the terminal device obtains the PCID carried in the SSB in the QCL reference signal from the network side through high-level signaling. In another example, the terminal device detects the SSB by itself to determine the PCID carried by the SSB used to obtain the MIB, the serving cell ID and other information.

Optionally, in the embodiment of the disclosure, when the downlink signal is a PDSCH or a CSI-RS configured with a repetition coefficient, in step S210, it can be determined whether the PCID carried by the first SSB is the same as the PCID carried by the SSB used to obtain the MIB. If they are the same, it means that the first SSB comes from the serving cell. If they are different, it means that the first SSB comes from the neighboring cell. Then the terminal device determines the multiplexing mode of the first SSB and the downlink signal according to the determining result. If the first SSB comes from the neighboring cell, the first SSB can support simultaneous reception of the first SSB and downlink signals. If the first SSB comes from the serving cell, it can support simultaneous reception of the first SSB and the downlink signal when certain conditions are met, such as the QCL type-D (type D) quasi co-location of the first SSB and the downlink signal. Specifically, one or more of the following conditions 1 to 3 may be involved.

Condition 1: In the case that the PCID carried by the first SSB is different from the PCID carried by the SSB used to obtain the MIB, it is determined that the multiplexing mode is: the first SSB and the downlink signal support transmission on the same OFDM (Orthogonal Frequency Division Multiplexing) symbol.

Condition 2: In the case that the PCID carried by the first SSB is the same as the PCID carried by the SSB used to obtain the MIB, it is determined that the multiplexing mode is: when the first SSB and the downlink signal are quasi co-located with respect to QCL type-D, the first SSB and the downlink signal support transmission in different PRBs (Physical Resource Blocks) on the same OFDM symbol. The transmission mode in different PRBs on the same OFDM symbol may also be referred to as FDM (Frequency-division multiplexing) mode.

Condition 3: In the case that the PCID carried by the first SSB is the same as the PCID carried by the SSB used to obtain the MIB, it is determined that the multiplexing mode is: when the first SSB and the downlink signal are not quasi co-located with respect to QCL type-D, the first SSB and the downlink signal are transmitted on different OFDM symbols. The transmission mode on different OFDM symbols may also be referred to as a TDM (Time Division Multiplexing) mode.

The condition where the first SSB and the downlink signal are not quasi co-located with respect to QCL type-D may include: the first SSB and the downlink signal do not have a quasi co-location relationship, or the quasi co-location relationship between the first SSB and the downlink signal is other types instead of QCL type-D.

Optionally, in the embodiment of the disclosure, when the downlink signal is a PDSCH or a CSI-RS configured with a repetition coefficient, in step S210, it may also be determined whether the PCID carried by the first SSB is the same as the serving cell ID. If they are the same, it means that the first SSB comes from the serving cell. If they are different, it means that the first SSB comes from the neighboring cell. Then the terminal device determines the multiplexing mode of the first SSB and the downlink signal according to the determining result. If the first SSB comes from the neighboring cell, it can support simultaneous reception of the first SSB and downlink signals. If the first SSB comes from the serving cell, it can support simultaneous reception of the first SSB and the downlink signal when certain conditions are met, such as the QCL type-D quasi co-location of the first SSB and the downlink signal. Specifically, one or more of the following conditions 4 to 6 may be involved.

Condition 4: In the case that the PCID carried by the first SSB is not the serving cell ID, it is determined that the multiplexing mode is: the first SSB and the downlink signal support transmission on the same OFDM symbol.

Condition 5: In the case that the PCID carried by the first SSB is the serving cell ID, it is determined that the multiplexing mode is: in the case that the first SSB and the downlink signal are quasi co-located with respect to QCL type-D, the first SSB and the downlink signal support transmission in different PRBs on the same OFDM symbol.

Condition 6: In the case that the PCID carried by the first SSB is the serving cell ID, it is determined that the multiplexing mode is: in the case that the first SSB and the downlink signal are not quasi co-located with respect to QCL type-D, the first SSB and the downlink signal are transmitted on different OFDM symbols.

Optionally, in the embodiment of the disclosure, in the case that the downlink signal is a PDCCH or a CSI-RS with no repetition coefficient configured, in step S210, it can also be determined whether the PCID carried by the first SSB is the same as the PCID carried by the SSB used to obtain the MIB. If they are the same, it means that the first SSB comes from the serving cell. If they are different, it means that the first SSB comes from the neighboring cell. Then the terminal device determines the multiplexing mode of the first SSB and the downlink signal according to the determining result. If the first SSB comes from the neighboring cell, it can support simultaneous reception of the first SSB and downlink signals. If the first SSB comes from the serving cell, it does not support simultaneous reception of the first SSB and downlink signals. Specifically, one or more of the following conditions 7 and 8 may be involved.

Condition 7: In the case that the PCID carried by the first SSB is different from the PCID carried by the SSB used to obtain the MIB, it is determined that the multiplexing mode is: the first SSB and the downlink signal support transmission on the same OFDM symbol.

Condition 8: In the case that the PCID carried by the first SSB is the same as the PCID carried by the SSB used to obtain the MIB, it is determined that the multiplexing mode is: the first SSB and the downlink signal are transmitted on different OFDM symbols.

Optionally, in the embodiment of the disclosure, in the case that the downlink signal is a PDCCH or a CSI-RS without a repetition coefficient configured, in step S210, it may also be determined whether the PCID carried by the first SSB is the same as the serving cell ID. If they are the same, it means that the first SSB comes from the serving cell. If they are different, it means that the first SSB comes from the neighboring cell. Then the terminal device determines the multiplexing mode of the first SSB and the downlink signal according to the determining result. If the first SSB comes from the neighboring cell, it can support simultaneous reception of the first SSB and downlink signal. If the first SSB comes from the serving cell, it does not support simultaneous reception of the first SSB and downlink signal. Specifically, one or more of the following conditions 9 and 10 may be involved.

Condition 9: In the case that the PCID carried by the first SSB is not the serving cell ID, it is determined that the multiplexing mode is: the first SSB and the downlink signal support transmission on the same OFDM symbol.

Condition 10: In the case that the PCID carried by the first SSB is the serving cell ID, it is determined that the multiplexing mode is: the first SSB and the downlink signal are transmitted on different OFDM symbols.

Optionally, in the embodiment of the disclosure, the downlink signal is a PDCCH (Physical Downlink Control Channel) or a CSI-RS with no repetition coefficient configured.

Optionally, in the embodiment of the disclosure, in the case that the downlink signal is the second SSB, in step S210, it may also be determined whether the PCID carried by the first SSB is the same as the PCID carried by the second SSB. If they are the same, it means that the two signals come from the same cell. If they are different, it means that the two signals come from different cells. Then, the terminal device determines the multiplexing mode of the first SSB and the second SSB according to the determining result, which may include one or more of the following conditions 11 to 14. Among them, the first SSB and the second SSBs are different SSBs. Here, different SSB means two different signals, that is, the information carried by them is not completely the same, or the information carried by them is completely different.

Condition 11: In the case that the PCID carried by the first SSB is different from the PCID carried by the second SSB, it is determined that the multiplexing mode is: in the case that the SSB indexes carried by the first SSB and the second SSB are different, the first SSB and the second SSB support transmission on the same OFDM symbol.

Condition 12: In the case that the PCID carried by the first SSB is different from the PCID carried by the second SSB, it is determined that the multiplexing mode is: in the case that the SSB indexes carried by the first SSB and the second SSB are the same, the first SSB and the second SSB are transmitted on different OFDM symbols.

Condition 13: In the case that the PCID carried by the first SSB is different from the PCID carried by the second SSB, it is determined that the multiplexing mode is: the first SSB and the second SSB support transmission on the same OFDM symbol.

Condition 14: In the case that the PCID carried by the first SSB is the same as the PCID carried by the second SSB, it is determined that the multiplexing mode is: the first SSB and the second SSB are transmitted on different OFDM symbols.

In the above condition, the first SSB and the downlink signal support transmission on the same OFDM symbol, which means that the first SSB and the downlink signal can be transmitted on the same OFDM symbol or on different OFDM symbols.

Optionally, in the embodiment of the disclosure, the multiplexing mode determined according to the above-mentioned condition 2 or condition 5 is: in the case that the first SSB and the downlink signal are quasi co-located with respect to QCL type-D, the first SSB and the downlink signal supports transmission in different PRBs on the same OFDM symbol. In step S220, the terminal device receives the first SSB and/or the downlink signal according to the multiplexing mode, including: in the condition that the SSB and the downlink signal are quasi co-located with respect to QCL type-D, the terminal device receives the first SSB and the downlink signal in different PRBs on the same OFDM symbol, or receives the first SSB and the downlink signal on different OFDM symbols.

Optionally, in this embodiment of the disclosure, the multiplexing mode determined according to the foregoing condition 3 or condition 6 is: in the case that the first SSB and the downlink signal are not quasi co-located with respect to QCL type-D, the first SSB and the downlink signal are transmitted on different OFDM symbols. In step S220, the terminal device receives the first SSB and/or the downlink signal according to the multiplexing mode, including: in the case that the SSB and the downlink signal are not quasi co-located with respect to QCL type-D, the terminal device receives the first SSB and the downlink signal on different OFDM symbols.

Optionally, in this embodiment of the disclosure, the multiplexing mode determined according to the above condition 11 is: in the case that the SSB indexes carried by the first SSB and the second SSB are different, the first SSB and the second SSB support transmission on the same OFDM symbol. In step S220, the terminal device receives the first SSB and/or the downlink signal according to the multiplexing mode, including: in the case that the SSB indexes carried by the first SSB and the second SSB are different, the terminal device receives the first SSB and the second SSB on the same or different OFDM symbols.

Optionally, in the embodiment of the disclosure, the multiplexing mode determined according to the above condition 12 is: in the case that the SSB indexes carried by the first SSB and the second SSB are the same, the first SSB and the second SSB are transmitted on different OFDM symbols. In step S220, the terminal device receives the first SSB and/or the downlink signal according to the multiplexing mode, including: in the case that the SSB indexes carried by the first SSB and the second SSB are the same, the terminal device receives the first SSB and the downlink signal on different OFDM symbols.

Optionally, in the embodiment of the disclosure, the multiplexing mode determined according to the above condition 1, condition 4, condition 7, condition 9 or condition 13 is: the first SSB and the downlink signal support transmission on the same OFDM symbol. In step S220, the terminal device receives the first SSB and/or the downlink signal according to the multiplexing mode, including: the terminal device receives the first SSB and the downlink signal on the same or different OFDM symbols.

Optionally, in the embodiment of the disclosure, the multiplexing mode determined according to the above condition 8, condition 10, or condition 14 is: the first SSB and the downlink signal are transmitted on different OFDM symbols. In step S220, the terminal device receives the first SSB and/or the downlink signal according to the multiplexing mode, including: the terminal device receives the first SSB and the downlink signal on different OFDM symbols.

In the embodiment of the disclosure, the PCID carried by the first SSB can be used to determine the multiplexing mode of the first SSB and the downlink signal, so as to support the multiplexing of the SSB from different cells and other downlink signals.

Furthermore, the terminal device can determine whether the SSB is from the serving cell or the neighboring cell according to the PCID carried by the SSB, and further determine whether the SSB and the downlink signal can be transmitted on the same OFDM symbol, and determine the multiplexing mode in the same OFDM symbol. Then the terminal device can receive the SSB from the neighboring cell as the QCL reference signal of other downlink signals based on the determined multiplexing mode, thereby realizing the multiplexing of the SSB from the neighboring cell and the downlink signal from the serving cell, thus better supporting multi-TRP transmission between cells.

Example 1

In this embodiment, the following example is provided based on the first downlink signal PDSCH (which may also be represented by PDSCH DMRS) as the downlink signal or a CSI-RS configured with repetition coefficients for description. Specifically, the repetition coefficient may be configured in the CSI-RS resource set. The downlink transmission method of this embodiment includes the following steps:

1. The terminal device determines the multiplexing mode of the first SSB and the downlink signal according to the physical cell identification PCID carried by the SSB. Specifically, in the case that the downlink signal is the first downlink signal, the following approach may be adopted:

(1) The multiplexing mode is determined according to whether the PCID carried by the first SSB is the same as the PCID carried by the SSB used to obtain the MIB.

(1-1) If the PCID carried by the first SSB is the same as the PCID carried by the SSB used to obtain the MIB, it is determined that the first SSB and the downlink signal support transmission in different PRBs on the same OFDM symbol in the case that the first SSB and the downlink signal are quasi co-located with respect to QCL type-D. That is, in the case that the first SSB and the downlink signal are related to quasi co-located with respect to QCL type-D, the first SSB and the downlink signal may be multiplexed in an FDM manner. If the first SSB and the downlink signal are not quasi co-located with respect to QCL type-D, the first SSB and the downlink signal are multiplexed in a TDM manner, that is, transmitted on different OFDM symbols. In this case, the first SSB and the downlink signal also support transmission on different OFDM symbols.

(1-2) If the PCID carried by the first SSB is different from the PCID carried by the SSB used to obtain the MIB, it is determined that the first SSB and the downlink signal support transmission on the same OFDM symbol. Specifically, the first SSB and the downlink signal may be transmitted in the same PRB, or may be transmitted in different PRBs. Under the circumstances, the first SSB and the downlink signal also support transmission on different OFDM symbols.

(2) The multiplexing mode is determined according to whether the PCID carried by the first SSB is the serving cell ID.

(2-1) If the PCID carried by the first SSB is the serving cell ID (also known as the service PCID or the main PCID), it is determined that the first SSB and the downlink signal support transmission in different PRBs on the same OFDM symbol (i.e., multiplexing in the FDM manner) in the case that the first SSB and the downlink signal are quasi co-located with respect to QCL type-D. Under the circumstances, the first SSB and the downlink signal also support transmission on different OFDM symbols.

(2-2) If the PCID carried by the first SSB is not the serving cell ID, it is determined that the first SSB and the downlink signal support transmission on the same OFDM symbol. Under the circumstances, the first SSB and the downlink signal also support transmission on different OFDM symbols.

2. The terminal device transmits the first SSB and/or the downlink signal according to the multiplexing mode.

(1) In an implementation, if the terminal device determines that the first SSB and the downlink signal are quasi co-located with respect to QCL type-D, the first SSB and the downlink signal support transmission in different PRBs on the same OFDM symbol. The terminal device receives at least one of the first SSB and the downlink signal on an OFDM symbol according to whether the first SSB and the downlink signal are quasi co-located with respect to QCL type-D.

(1-1) If the first SSB and the downlink signal are quasi co-located with respect to QCL type-D, the terminal device can receive the first SSB and the downlink signal in different PRBs of an OFDM symbol. Under the circumstances, the terminal device can also receive the first SSB and the downlink signal on different OFDM symbols.

(1-2) If the first SSB and the downlink signal are not quasi co-located with respect to QCL type-D, the terminal device cannot receive the first SSB and the downlink signal simultaneously on one OFDM symbol. Instead, the terminal device receives the two signals on different OFDM symbols. If the network device transmits these two signals simultaneously on the same OFDM symbol, the terminal device may not receive these two signals.

(2) If the terminal device determines that the first SSB and the downlink signal support transmission on the same OFDM symbol, the terminal device can receive the first SSB and the downlink signal on the same OFDM symbol, or the terminal device can receive the first SSB and the downlink signal on different OFDM symbols.

Example 2

In this embodiment, the following example is provided based on the second downlink signal PDCCH (which may also be represented by PDCCH DMRS) as the downlink signal or a CSI-RS not configured with repetition coefficients for description. Specifically, the repetition coefficient may be configured in the CSI-RS resource set. The downlink transmission method of this embodiment includes the following steps:

1. The terminal device determines the multiplexing mode of the first SSB and the downlink signal according to the physical cell identification PCID carried by the SSB. Specifically, in the case that the downlink signal is the second downlink signal, the following approach may be adopted:

(1) The multiplexing mode is determined according to whether the PCID carried by the first SSB is the same as the PCID carried by the SSB used to obtain the MIB.

(1-1) If the PCID carried by the first SSB is the same as the PCID carried by the SSB used to obtain the MIB, it is determined that the first SSB and the downlink signal are transmitted on different OFDM symbols. That is, the first SSB is multiplexed with the downlink signal in a TDM manner.

(1-2) If the PCID carried by the first SSB is different from the PCID carried by the SSB used to obtain the MIB, it is determined that the first SSB and the downlink signal support transmission on the same OFDM symbol. Specifically, the first SSB and the downlink signal may be transmitted in the same PRB, or may be transmitted in different PRBs. Under the circumstances, the first SSB and the downlink signal also support transmission on different OFDM symbols.

(2) The multiplexing mode is determined according to whether the PCID carried by the first SSB is the serving cell ID.

(2-1) If the PCID carried by the first SSB is the serving cell ID (also referred to as service PCID or main PCID), it is determined that the first SSB and the downlink signal are transmitted on different OFDM symbols. That is, the first SSB is multiplexed with the downlink signal in a TDM manner.

(2-2) If the PCID carried by the first SSB is not the serving cell ID, it is determined that the first SSB and the downlink signal support transmission on the same OFDM symbol. Specifically, the first SSB and the downlink signal may be transmitted in the same PRB, or may be transmitted in different PRBs. Under the circumstances, the first SSB and the downlink signal also support transmission on different OFDM symbols.

2. The terminal device transmits the first SSB and/or the downlink signal according to the multiplexing mode.

(1) In an implementation, if the terminal device determines that the first SSB and the downlink signal support transmission on the same OFDM symbol, the terminal device supports the reception of the first SSB and the downlink signal on the same OFDM symbol, and also supports the reception of the first SSB and the downlink signal on different OFDM symbols.

(2) In another implementation, if the terminal device determines that the first SSB and the downlink signal are transmitted on different OFDM symbols, the terminal device cannot simultaneously receive the first SSB and the downlink signal on one OFDM symbol. If the network device transmits these two signals simultaneously on the same OFDM symbol, the terminal device may not receive these two signals.

Example 3

In this embodiment, the following example is provided based on SSB as the downlink signal for description. The downlink transmission method of this embodiment includes the following steps:

1. The terminal device determines the multiplexing mode of the first SSB and the downlink signal according to the physical cell identification PCID carried by the SSB. Specifically, in the case that the downlink signal is the second SSB, the following approach may be adopted:

(1) If the PCID carried by the first SSB is the same as the PCID carried by the second SSB, it is determined that the first SSB and the second SSB are transmitted on different OFDM symbols, that is, the TDM multiplexing mode is adopted.

(2) If the PCID carried by the first SSB is different from the PCID carried by the second SSB, it is determined that the first SSB and the second SSB support transmission on the same OFDM symbol. Under the circumstances, the SSB indexes carried by the two SSBs may be the same or different. Or, if the PCID carried by the first SSB is different from the PCID carried by the second SSB, it is determined that the first SSB and the second SSB support transmission on the same OFDM symbol when the SSB indexes carried by the first SSB and the second SSB are different. If the SSB indexes carried by the first SSB and the second SSB are the same, they cannot be multiplexed on the same OFDM symbol and they are transmitted on different OFDM symbols, that is, the TDM multiplexing mode is adopted.

2. The terminal device transmits the first SSB and/or the second SSB according to the multiplexing mode.

(1) In an implementation, if the terminal device determines that the first SSB and the second SSB support transmission on the same OFDM symbol when the SSB indexes carried by the first SSB and the second SSB are different, then the terminal device receives at least one of the first SSB and the second SSB on one OFDM symbol according to whether the first SSB and the second SSB carry the same SSB index.

(1-1) If the first SSB and the second SSB carry the same SSB index, the terminal device receives the first SSB and the second SSB on different OFDM symbols. If the network device transmits these two signals simultaneously on the same OFDM symbol, the terminal device may not receive the two signals.

(1-2) If the first SSB and the second SSB carry different SSB indexes, the terminal device can receive the first SSB and the second SSB on the same OFDM symbol, or the terminal device can receive the first SSB and the second SSB on different OFDM symbols.

(2) In another implementation, if the terminal device determines that the first SSB and the second SSB are transmitted on different OFDM symbols, the terminal device cannot simultaneously receive the first SSB and the second SSB on one OFDM symbol. If the network device transmits these two signals simultaneously on the same OFDM symbol, the terminal device may not receive the two signals.

Based on the method in the embodiment of the disclosure, the terminal device can determine whether the SSB is from the serving cell or the neighboring cell according to the PCID carried by the SSB, and further determine whether the SSB and the downlink data as well as the downlink reference signal can be transmitted on the same OFDM symbol, and determine the multiplexing mode in the same OFDM symbol. As such, the terminal device can receive the SSB from the neighboring cell as the QCL reference signal of other downlink signals, thereby better supporting multi-TRP transmission between cells.

FIG. 5 is a schematic block diagram of a terminal device 300 according to an embodiment of the disclosure. The terminal device 300 can include:

A processing unit 310 is configured to determine the multiplexing mode of the first SSB and the downlink signal according to the PCID carried by the first SSB.

A communication unit 320 is configured to receive the first SSB and/or the downlink signal according to the multiplexing mode.

Optionally, in the embodiment of the disclosure, the processing unit 310 is further configured to: in the case that the PCID carried by the first SSB is different from the PCID carried by the SSB used to obtain the MIB, determine that the multiplexing mode is: the first SSB and the downlink signal support transmission on the same OFDM symbol.

Optionally, in the embodiment of the disclosure, the processing unit 310 is further configured to: in the case that the PCID carried by the first SSB is the same as the PCID carried by the SSB used to obtain the MIB, determine that the multiplexing mode is: in the case that the first SSB and the downlink signal are quasi co-located with respect to QCL type-D, the first SSB and the downlink signal support transmission in different PRBs on the same OFDM symbol.

Optionally, in the embodiment of the disclosure, the downlink signal is a physical downlink shared channel PDSCH or a channel state information reference signal CSI-RS configured with a repetition coefficient.

Under the circumstances, the processing unit 310 may further be configured to: in the case that the PCID carried by the first SSB is the same as the PCID carried by the SSB used to obtain the MIB, determine that the multiplexing mode is: in the case that the first SSB and the downlink signal are not quasi co-located with respect to QCL type-D, the first SSB and the downlink signal are transmitted on different OFDM symbols.

Under the circumstances, the processing unit 310 may further be configured to: in the case that the PCID carried by the first SSB is not the serving cell ID, determine that the multiplexing mode is: the first SSB and the downlink signal support transmission on the same OFDM symbol.

Under the circumstances, the processing unit 310 may further be configured to: in the case that the PCID carried by the first SSB is the serving cell ID, determine that the multiplexing mode is: in the case that the first SSB and the downlink signal are quasi co-located with respect to QCL type-D, the first SSB and the downlink signal support transmission in different PRBs on the same OFDM symbol.

Under the circumstances, the processing unit 310 may further be configured to: in the case that the PCID carried by the first SSB is the serving cell ID, determine that the multiplexing mode is: in the case that the first SSB and the downlink signal are not quasi co-located with respect to QCL type-D, the first SSB and the downlink signal are transmitted on different OFDM symbols.

Optionally, in this embodiment of the disclosure, the downlink signal is a physical downlink control channel PDCCH or a CSI-RS with no repetition coefficient configured.

Under the circumstances, the processing unit 310 may further be configured to: in the case that the PCID carried by the first SSB is different from the PCID carried by the SSB used to obtain the MIB, determine that the multiplexing mode is: the first SSB and the downlink signal support transmission on the same OFDM symbol.

Under the circumstances, the processing unit 310 may further be configured to: in the case that the PCID carried by the first SSB is the same as the PCID carried by the SSB used to obtain the MIB, determine that the multiplexing mode is: the first SSB and the downlink signal are transmitted on different OFDM symbols.

Under the circumstances, the processing unit 310 may further be configured to: in the case that the PCID carried by the first SSB is not the serving cell ID, determine that the multiplexing mode is: the first SSB and the downlink signal support transmission on the same OFDM symbol.

Under the circumstances, the processing unit 310 may further be configured to: in the case that the PCID carried by the first SSB is the serving cell ID, determine that the multiplexing mode is: the first SSB and the downlink signal are transmitted on different OFDM symbols.

Optionally, in the embodiment of the disclosure, in the case that the downlink signal is the second SSB, the processing unit 310 may further be configured to: in the case that the PCID carried by the first SSB is different from the PCID carried by the second SSB, determine that the multiplexing mode is: in the case that the SSB indexes carried by the first SSB and the second SSB are different, the first SSB and the second SSB support transmission on the same OFDM symbol.

Optionally, in the embodiment of the disclosure, in the case that the downlink signal is the second SSB, the processing unit 310 may further be configured to: in the case that the PCID carried by the first SSB is different from the PCID carried by the second SSB, determine that the multiplexing mode is: in the case that the SSB indexes carried by the first SSB and the second SSB are the same, the first SSB and the second SSB are transmitted on different OFDM symbols.

Optionally, in the embodiment of the disclosure, when the downlink signal is the second SSB, the processing unit 310 may further be configured to: in the case that the PCID carried by the first SSB is different from the PCID carried by the second SSB, determine that the multiplexing mode is: the first SSB and the second SSB support transmission on the same OFDM symbol.

Optionally, in the embodiment of the disclosure, in the case that the downlink signal is the second SSB, the processing unit 310 may further be configured to: in the case that the PCID carried by the first SSB is the same as the PCID carried by the second SSB, determine that the multiplexing mode is: the first SSB and the second SSB are transmitted on different OFDM symbols.

Optionally, in the embodiment of the disclosure, the multiplexing mode determined by the processing unit 310 is: in the case that the first SSB and the downlink signal are quasi co-located with respect to QCL type-D, the first SSB and the downlink signal support transmission in different PRBs on the same OFDM symbol. The communication unit 320 is further configured to: in the case that the first SSB and the downlink signal are quasi co-located with respect to QCL type-D, receive the first SSB and the downlink signal in different PRBs on the same OFDM symbol, or receive the first SSB and the downlink signal on different OFDM symbols.

Optionally, in the embodiment of the disclosure, the multiplexing mode determined by the processing unit 310 is: in the case that the first SSB and the downlink signal are not quasi co-located with QCL type-D, the first SSB and the downlink signal are transmitted on different OFDM symbols. The communication unit 320 is further configured to: in the case that the first SSB and the downlink signal are not quasi co-located with respect to QCL type-D, receive the first SSB and the downlink signal on different OFDM symbols.

Optionally, in the embodiment of the disclosure, the multiplexing mode determined by the processing unit 310 is: in the case that the SSB indexes carried by the first SSB and the second SSB are different, the first SSB and the second SSB support transmission on the same OFDM symbol. The communication unit 320 is further configured to: in the case that the SSB indexes carried by the first SSB and the second SSB are different, receive the first SSB and the second SSB on the same or different OFDM symbols.

Optionally, in the embodiment of the disclosure, the multiplexing mode determined by the processing unit 310 is: in the case that the SSB indexes carried by the first SSB and the second SSB are the same, the first SSB and the second SSB are transmitted on different OFDM symbols. The communication unit 320 is further configured to: in the case that the SSB indexes carried by the first SSB and the second SSB are the same, receive the first SSB and the second SSB on different OFDM symbols.

Optionally, in this embodiment of the disclosure, the multiplexing mode determined by the processing unit 310 is that the first SSB and the downlink signal support transmission on the same OFDM symbol. The communication unit 320 is further configured to: receive the first SSB and the downlink signal on the same or different OFDM symbols.

Optionally, in this embodiment of the disclosure, the multiplexing mode determined by the processing unit 310 is that the first SSB and the downlink signal are transmitted on different OFDM symbols. The communication unit 320 is further configured to: receive the first SSB and the downlink signal on different OFDM symbols.

It should be understood that the foregoing and other operations and/or functions of the various units in the terminal device described in the embodiments of the disclosure are set to implement the corresponding process of the terminal device in the method 200 in FIG. 4. For conciseness, no further details are incorporated herein.

Figure 6:
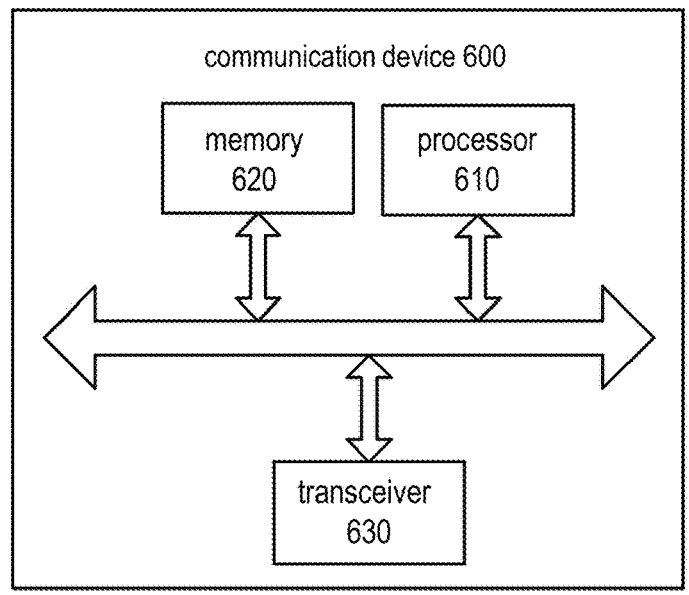
FIG. 6 is a schematic block diagram of a communication device according to an embodiment of the disclosure.

FIG. 6 is a schematic structural diagram of a communication device 600 according to an embodiment of the disclosure. The communication device 600 shown in FIG. 6 includes a processor 610, and the processor 610 can invoke and run a computer program in the memory to implement the method in the embodiment of the disclosure.

Optionally, as shown in FIG. 6, the communication device 600 may further include a memory 620. The processor 610 can invoke and run a computer program in the memory 620 to implement the method in the embodiment of the disclosure.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices. Specifically, the transceiver 630 may send information or data to other devices, or receive information or data sent by other devices.

Specifically, the transceiver 630 may include a transmitter and a receiver. The transceiver 630 may further include an antenna, and the number of antennas may be one or more.

Optionally, the communication device 600 may be a network device in an embodiment of the disclosure, and the communication device 600 may implement corresponding processes implemented by the network device in various methods in the embodiments of the disclosure. For conciseness, no further details are not described herein.

Optionally, the communication device 600 may be a terminal device in an embodiment of the disclosure, and the communication device 600 may implement the corresponding processes implemented by the terminal device in various methods in the embodiments of the disclosure. For conciseness, no further details are not described herein.

Figure 7:
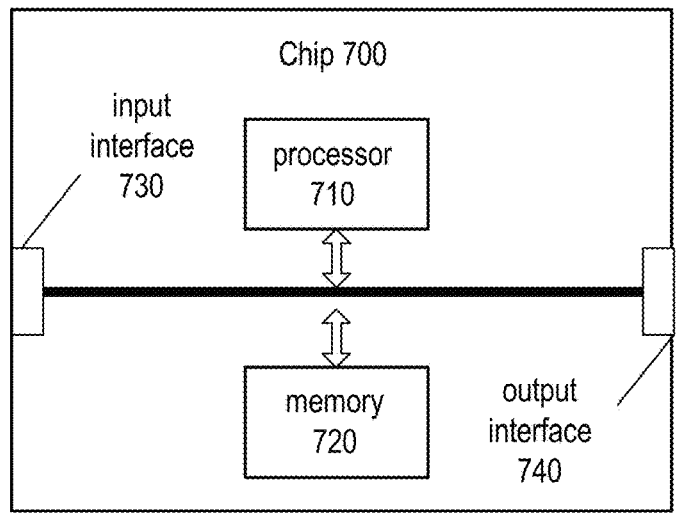
FIG. 7 is a schematic block diagram of a chip according to an embodiment of the disclosure.

FIG. 7 is a schematic structural diagram of a chip 700 according to an embodiment of the disclosure. The chip 700 shown in FIG. 7 includes a processor 710, and the processor 710 can invoke and run a computer program in the memory to implement the method in the embodiment of the disclosure.

Optionally, as shown in FIG. 7, the chip 700 may further include a memory 720. The processor 710 can invoke and run a computer program in the memory 720 to implement the method in the embodiment of the disclosure.

The memory 720 may be a separate device independent of the processor 710, or may be integrated in the processor 710.

Optionally, the chip 700 may further include an input interface 730. The processor 710 can control the input interface 730 to communicate with other devices or chips, and specifically, can obtain information or data sent by other devices or chips.

Optionally, the chip 700 may further include an output interface 740. The processor 710 can control the output interface 740 to communicate with other devices or chips, specifically, can output information or data to other devices or chips.

Optionally, the chip can be applied to the network device in the embodiments of the disclosure, and the chip can implement the corresponding processes implemented by the network device in the various methods in the embodiments of the disclosure. For conciseness, no further details are escribed herein.

Optionally, the chip can be applied to the terminal device in the embodiment of the disclosure, and the chip can implement the corresponding process implemented by the terminal device in various methods in the embodiment of the disclosure. For conciseness, no further details are escribed herein.

It should be understood that the chip mentioned in the embodiment of the disclosure may also be referred to as a system-level chip, a system chip, a chip system, or a system-on-chip.

The processors described above may be general-purpose processors, digital signal processors (DSP), field programmable gate arrays (FPGAs), application specific integrated circuits (ASICs) or other programmable logic devices, transistor logic devices, discrete hardware components, etc. The aforementioned general-purpose processor may be a microprocessor or any conventional processor.

The memory described above may be volatile memory or non-volatile memory, or may include both volatile and non-volatile memory. Specifically, non-volatile memory can be Read-Only Memory (ROM), Programmable ROM (PROM), Erasable PROM (EPROM), Electrically EPROM (EEPROM) or flash memory. The volatile memory may be a Random Access Memory (RAM).

It should be understood that the above-mentioned memory is exemplary but not limited thereto. For example, the memory in the embodiment of the disclosure may also be static RAM (SRAM), dynamic RAM (DRAM), synchronous DRAM (SDRAM), double data rate SDRAM (DDR SDRAM), enhanced SDRA (ESDRAM), synch link DRAM (SLDRAM), and Direct Rambus RAM (DR RAM), etc. That is to say, the memory in the embodiments of the disclosure is intended to include but not limited to these and any other types of memory applicable.

Figure 8:
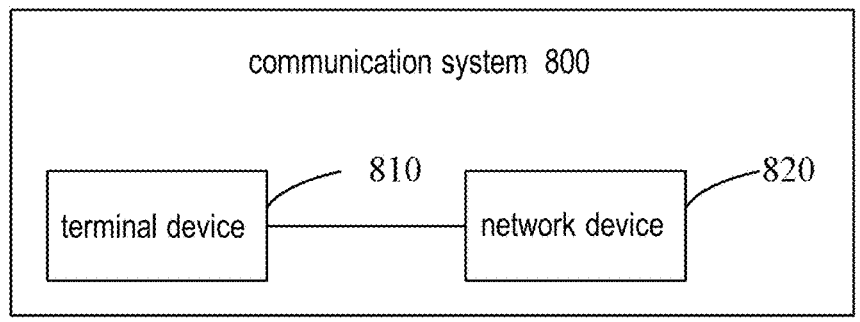
FIG. 8 is a schematic block diagram of a communication system according to an embodiment of the disclosure.

FIG. 8 is a schematic block diagram of a communication system 800 embodied in an embodiment of the disclosure. As shown in FIG. 8, the communication system 800 includes a terminal device 810 and a network device 820.

The terminal device 810 determines the multiplexing mode of the first SSB and the downlink signal according to the PCID carried by the first SSB, and receives the first SSB and/or the downlink signal according to the multiplexing mode.

Specifically, the terminal device 810 can be used to implement the corresponding functions implemented by the terminal device in the above method, and the network device 820 can be used to implement the corresponding functions implemented by the network device in the above method. For conciseness, no further details are not incorporated herein.

The above embodiments may be implemented as a whole or in part by software, hardware, firmware, or any combination thereof. When the above embodiments are implemented by software, they can be implemented as a whole or in part in the form of a computer program product. The computer program product includes one or more computer instructions. When the computer program instructions are loaded and executed on the computer, the processes or functions described in the embodiments of the disclosure are generated as a whole or in part. The computer can be a general-purpose computer, a specific-purpose computer, a computer network, or other programmable devices. The computer instruction can be stored in a computer-readable storage medium, or transmitted from one computer-readable storage medium to another computer-readable storage medium. For example, the computer instruction can be transmitted from a website, a computer, a server, or a data center to another website, computer, server or data center in a wired manner (such as coaxial cable, optical fiber, Digital Subscriber Line (DSL)) or a wireless manner (such as infrared, wireless, microwave, etc.). The computer-readable storage medium may be any available medium that can be accessed by a computer or a data storage device such as a server or data center integrated with one or more available media. The usable medium may be a magnetic medium (for example, a floppy disk, a hard disk, and a magnetic tape), an optical medium (for example, a DVD), or a semiconductor medium (for example, a Solid State Disk (SSD)) and so on.

It should be understood that in the various embodiments of the disclosure, the numbers for denoting the above-mentioned processes do not mean the order of execution. The execution order of each process should be determined by its function and internal logic, and should not be construed as a limitation to the implementation process of the embodiments of the disclosure.

The practitioners in the field can clearly understand that, for the convenience and conciseness of the description, the specific operation process of the above-described system, device, and unit can be deduced from the corresponding process in the foregoing method embodiment, and no further description is incorporated herein.

The above are only specific implementations of this disclosure, but the scope to be protected by this disclosure is not limited thereto. Any person skilled in the art can easily think of changes or substitutions within the technical scope disclosed in this disclosure, and the changes or substitutions should fall within the scope to be protected by the disclosure. Therefore, the scope to be protected by the disclosure shall be subject to the scope of claims.

What is claimed is:

1. A downlink transmission method, comprising:
    determining, by a terminal device, a multiplexing mode of a first synchronization signal block (SSB) and a downlink signal according to whether the first SSB is from a serving cell or from a neighboring cell, comprising:
        in the case that the first SSB is not from the serving cell, determining that the multiplexing mode is: the first SSB and the downlink signal support transmission on the same OFDM symbol;
        in the case that the first SSB is from the serving cell, determining that the multiplexing mode is: the first SSB and the downlink signal are transmitted on different OFDM symbols;
    receiving, by the terminal device, the downlink signal according to the multiplexing mode, comprising:
        in the case where the multiplexing mode is to support transmission on the same symbol, the terminal device receives the first SSB and the downlink signal on the same or different OFDM symbols, and the terminal device supports reception of the first SSB and the downlink signal on the same OFDM symbol, and also supports reception of the first SSB and the downlink signal on different OFDM symbols.

2. The method according to claim 1, wherein the downlink signal is a physical downlink shared channel (PDSCH) or a channel state information reference signal (CSI-RS) configured with a repetition coefficient.

3. The method according to claim 1, wherein the multiplexing mode is to support transmission on different OFDM symbols,
    the terminal device receives the first SSB and the downlink signal on different OFDM symbols.

4. A terminal device, comprising: a processor and a memory, wherein the memory is configured to store a computer program, and the processor is configured to invoke and run the computer program stored in the memory to execute:
    determining a multiplexing mode of a first synchronization signal block (SSB) and a downlink signal according to whether the first synchronization signal block (SSB) is from a serving cell or from a neighboring cell, comprising:
        in the case that the first SSB is not from the serving cell, determining that the multiplexing mode is: the first SSB and the downlink signal support transmission on the same OFDM symbol;
        in the case that the first SSB is from the serving cell, determining that the multiplexing mode is: the first SSB and the downlink signal are transmitted on different OFDM symbols;
    receiving the downlink signal according to the multiplexing mode, comprising:
        in the case where the multiplexing mode is to support transmission on the same symbol, the processor receives the first SSB and the downlink signal on the same or different OFDM symbols, and the terminal device supports reception of the first SSB and the downlink signal on the same OFDM symbol, and also supports reception of the first SSB and the downlink signal on different OFDM symbols.

5. The terminal device according to claim 4, wherein the downlink signal is a physical downlink shared channel (PDSCH) or a channel state information reference signal (CSI-RS) configured with a repetition coefficient.

6. The terminal device according to claim 4, wherein the multiplexing mode is to support transmission on different OFDM symbols,
    the terminal device receives the first SSB and the downlink signal on different OFDM symbols.

7. A non-transitory computer-readable storage medium, configured to store a computer program that enables a computer to execute:
    determining a multiplexing mode of a first synchronization signal block (SSB) and a downlink signal according to whether the first SSB is from a serving cell or from a neighboring cell, comprising:
        in the case that the first SSB is not from the serving cell, determining that the multiplexing mode is: the first SSB and the downlink signal support transmission on the same OFDM symbol;
        in the case that the first SSB is from the serving cell, determining that the multiplexing mode is: the first SSB and the downlink signal are transmitted on different OFDM symbols;
    receiving the downlink signal according to the multiplexing mode, comprising:
        in the case where the multiplexing mode is to support transmission on the same symbol, receiving the first SSB and the downlink signal on the same or different OFDM symbols, and the computer supports reception of the first SSB and the downlink signal on the same OFDM symbol, and also supports reception of the first SSB and the downlink signal on different OFDM symbols.

8. The non-transitory computer-readable storage medium according to claim 7, wherein the downlink signal is a physical downlink shared channel (PDSCH) or a channel state information reference signal (CSI-RS) configured with a repetition coefficient.

* * * * *